(12) United States Patent
Xue et al.

(10) Patent No.: US 11,537,582 B2
(45) Date of Patent: Dec. 27, 2022

(54) DATA ACCESS METHOD, A DATA ACCESS CONTROL DEVICE, AND A DATA ACCESS SYSTEM

(71) Applicant: SAMSUNG ELECTRONICS CO., LTD., Suwon-si (KR)

(72) Inventors: Lijuan Xue, Xi'an (CN); Hao Yan, Xi'an (CN); Sha Shi, Xi'an (CN); Yufang Li, Xi'an (CN); Wenbin Cao, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/354,397

(22) Filed: Jun. 22, 2021

(65) Prior Publication Data

US 2022/0335028 A1 Oct. 20, 2022

(30) Foreign Application Priority Data

Apr. 16, 2021 (CN) .......................... 202110413837.9

(51) Int. Cl.
*G06F 16/22* (2019.01)
*G06F 16/2455* (2019.01)
*G06F 16/248* (2019.01)
*G06F 16/215* (2019.01)

(52) U.S. Cl.
CPC ........ *G06F 16/2246* (2019.01); *G06F 16/215* (2019.01); *G06F 16/248* (2019.01); *G06F 16/2455* (2019.01)

(58) Field of Classification Search
CPC .............. G06F 16/2246; G06F 16/215; G06F 16/2455; G06F 16/248
See application file for complete search history.

(56) References Cited

U.S. PATENT DOCUMENTS

| | | | |
|---|---|---|---|
| 8,433,695 B2 | 4/2013 | Wu et al. | |
| 9,400,816 B1* | 7/2016 | Gubarev | G06F 16/2246 |
| 10,445,022 B1 | 10/2019 | Qui et al. | |
| 10,684,787 B1 | 6/2020 | Li et al. | |
| 10,795,871 B2 | 10/2020 | Velayudhan Pillai et al. | |
| 2015/0058548 A1 | 2/2015 | Fong et al. | |
| 2018/0150472 A1 | 5/2018 | Chen et al. | |
| 2018/0349095 A1 | 12/2018 | Wu et al. | |
| 2018/0373708 A1* | 12/2018 | Martin | G06F 16/2246 |
| 2019/0332329 A1 | 10/2019 | Qui et al. | |

(Continued)

FOREIGN PATENT DOCUMENTS

| | | |
|---|---|---|
| CN | 102971732 A | 3/2013 |
| CN | 103559027 A | 2/2014 |
| CN | 105117415 B | 7/2018 |

(Continued)

*Primary Examiner* — Huawen A Peng
(74) *Attorney, Agent, or Firm* — Sughrue Mion, PLLC

(57) ABSTRACT

Provided is a data access method including generating an index corresponding to a key in a first key-value pair in response to receiving the first key-value pair, writing the key-index pair corresponding to the key and the index into a block storage device, the key-index pair being stored in the block storage device in a log-structured merge-tree (LSM-Tree) structure, writing an index-value pair corresponding to the index and the value in the first key-value pair into a key-value solid state drive (KV SSD).

15 Claims, 6 Drawing Sheets

(56) References Cited

U.S. PATENT DOCUMENTS

2020/0334292 A1* 10/2020 Ganeshan ............. G06F 3/0604

FOREIGN PATENT DOCUMENTS

| CN | 104408091 B | 3/2019 |
|----|-------------|--------|
| CN | 109521959 A | 3/2019 |
| CN | 110825748 A | 2/2020 |
| CN | 110347336 B | 7/2020 |
| CN | 111399777 A | 7/2020 |

* cited by examiner

DATA ACCESS METHOD, A DATA ACCESS CONTROL DEVICE, AND A DATA ACCESS SYSTEM

CROSS-REFERENCE TO THE RELATED APPLICATION

This U.S. non-provisional patent application claims priority under 35 U.S.C. § 119 to Chinese Patent Application No. 202110413837.9, filed on Apr. 16, 2021, in the Chinese National Intellectual Property Administration, the disclosure of which is hereby incorporated by reference in its entirety.

BACKGROUND

1. Technical Field

Example embodiments of the present application relate to data access technology, and more specifically, to a data access method, a data access control device, and a data access system.

2. Description of Related Art

Log-structured merge-tree (LSM-Tree) is a data storage architecture used by current mainstream database engines.

Referring to a schematic diagram for storage process of the classic LevelDB LSM-Tree shown in FIG. 1, the entire storage process mainly includes a key-value pair <key, value> KV written by an application layer being directly appended to a Log file (step 1), the key-value pair <key, value> KV being randomly written into the memTable memT of a memory and sorted (step 2), when the memTable memT is full, marking it as immutable (step 3), data that is marked as immutable being flushed to a sort string table (SSTable) file of the zeroth layer (L0) of the block storage device (step 4), the background thread performing compaction with respect to the SSTable layer by layer (step 5), where input and output for the block storage device are all sequential operations in step 4 and step 5.

As described above, the storage process of LSM-Tree in the block storage device adopts a sequential writing mechanism, which can greatly improve writing performance of the block storage device, for example, hard disk drive (HDD), block solid state drive (block SSD). At the same time, as the LSM-Tree described above, the LSM-Tree database engine based on the block storage device relies on a file system to write on SSTable files, and thus can be applied to the block storage device.

However, when writing data or updating data, because all of the writing for the block storage device are append-only instead of in-place update, invalid data will not be cleaned immediately. Therefore, the storage for LSM-Tree in the block storage device has a severe space amplification problem, which in turn leads to a problem of shortening the service life of the SSD and increasing storage cost.

It is necessary to develop technologies to not only use the fast writing (sequential writing) performance of the LSM-Tree database in the block storage device and depend on SSTable file storage for LSM-Tree on the block storage device, but also extend the life of storage device of the database to reduce the storage cost of database.

SUMMARY

One or more example embodiments provide a data access method, a data access control device, and a data storage system, which can not only employ the fast writing (sequential writing) performance of LSM-Tree database for the block storage device and depend on SSTable file storage for the LSM-Tree on the block storage device, but also extend the life of the storage device of the database to reduce storage cost for database.

According to an aspect of an example embodiment, there is provided a data access method including generating an index corresponding to a key in a first key-value pair in response to receiving the first key-value pair, writing a key-index pair corresponding to the key and the index into a block storage device, the key-index pair being stored in the block storage device in a log-structured merge-tree (LSM-Tree) structure, writing an index-value pair corresponding to the index and a value in the first key-value pair into a key-value solid state drive (KV SSD).

According to another aspect of an example embodiment, there is provided a data access control device including at least one processor configured to implement an index generating unit configured to generate an index corresponding to a key in a first key-value pair in response to receiving the first key-value pair, a writing unit configured to write a key-index pair corresponding to the key and the index into a block storage device, the key-index pair being stored in the block storage device in a log-structured merge-tree (LSM-Tree) structure, and write an index-value pair corresponding to the index and a value in the first key-value pair into a key-value solid state drive (KV SSD).

According to another aspect of an example embodiment, there is provided a data access system including a block storage device, a key-value solid state drive (KV SSD), and a data access control device including at least one processor configured to implement as an index generating unit configured to generate an index corresponding to a key in a first key-value pair in response to receiving the first key-value pair, a writing unit configured to write a key-index pair corresponding to the key and the index into the block storage device, the key-index pair being stored in the block storage device in a log-structured merge-tree (LSM-Tree) structure, and write an index-value pair corresponding to the index and a value in the key-value pair into the KV SSD.

BRIEF DESCRIPTION OF THE DRAWINGS

The above and/or other purposes and features of example embodiments will become more apparent from the following description taken in conjunction with the accompanying drawings, wherein.

DETAILED DESCRIPTION OF EXEMPLARY EMBODIMENTS

Figure 1:
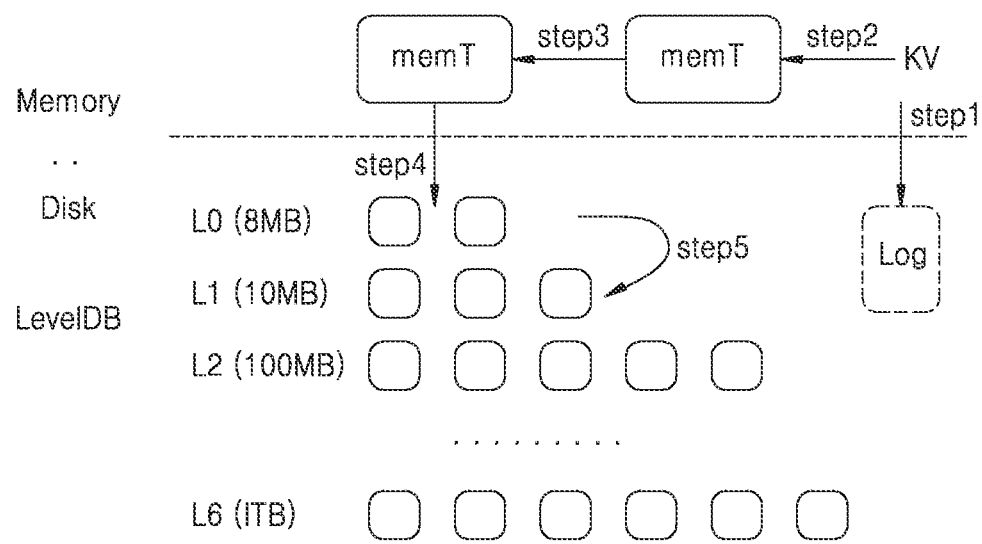
FIG. 1 is a schematic diagram showing a storage process for the related LevelDB LSM-tree.

Hereinafter, various example embodiments are described with reference to the accompanying drawings, in which like reference numerals are used to depict the same or similar elements, features, and structures. However, the present disclosure is not intended to be limited by the various example embodiments described herein to a specific example embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are merely used to enable a clear and consistent understanding of the present disclosure. Accordingly, it should be apparent to those skilled in the art that the following description of various example embodiments is provided for illustration purpose only and not for the purpose of limiting the present disclosure as defined by the appended claims and their equivalents.

It is to be understood that the singular forms include plural forms, unless the context clearly dictates otherwise. The terms "include," "comprise," and "have," used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various example embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to," used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe example embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding example embodiments of the present disclosure.

Figure 2:
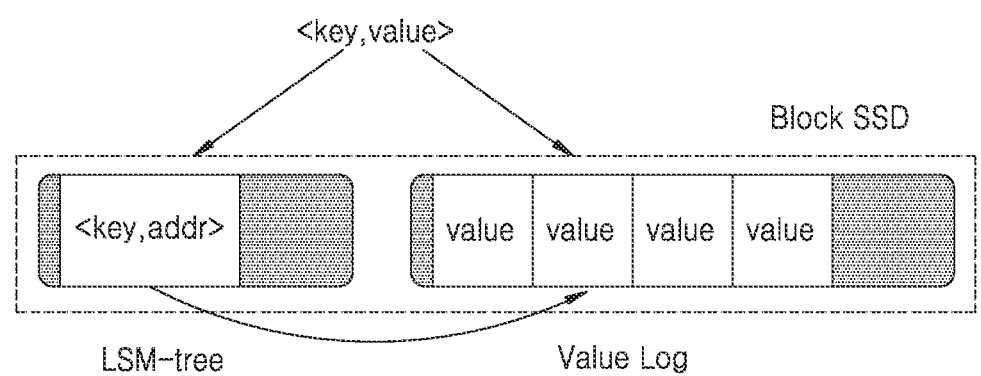
FIG. 2 is a diagram showing storage scheme for a wisckey key-value.

FIG. 2 is a diagram showing storage scheme for a wisckey key-value. Wisckey is a LSM-tree-based key-value store in a block SSD that separates keys from values to reduce input/output amplification.

Figure 3:
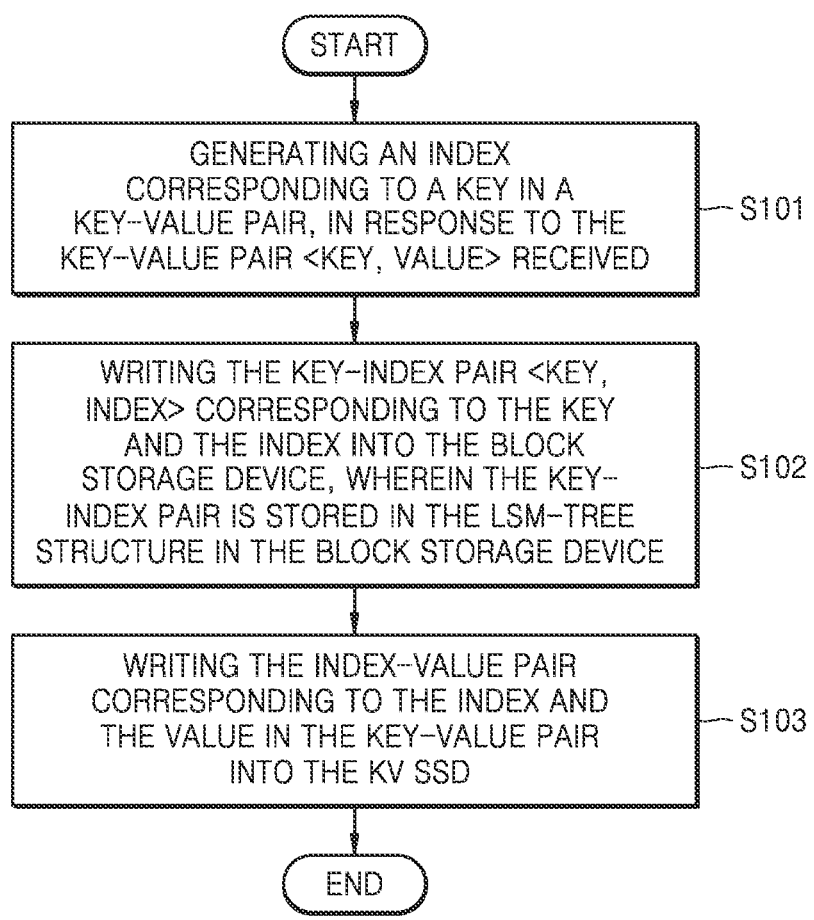
FIG. 3 is a flow chart showing a data access method according to an example embodiment.

FIG. 3 is a flowchart showing a data access method according to an example embodiment.

An electronic device having a block SSD and a KV SSD is described as an example.

According to an example embodiment, the following data access method may be executed by an application installed in the electronic device.

However, the electronic device having the block storage device and the KV SSD is only an example for illustrative purposes, and does not limit embodiments of the present disclosure.

Referring FIG. 3, in step S101, in response to a key-value pair <key, value> being received, an index corresponding to the key in the key-value pair is generated. As an example, the index may be generated for the key in the inputted key-value pair. wherein In general, a length of the index is significantly smaller than a length of the value. As an example, indices generated for keys may have an identical length, for example, the length of the index corresponding to each key-value pair may be the same.

According to an example embodiment, the index corresponding to the key in the key-value pair can be generated by an application.

In step S102, the key-index pair <key, index> corresponding to the key and the index is written into the block storage device. The key-index pair is stored in the LSM-Tree structure in the block storage device. For example, the key-index pair is stored based on the LSM-Tree data architecture.

For example, according to the storage mechanism of the LSM-Tree database, since the writing operation is a sequential write, <key, index> may be more quickly written into the block storage device.

The block storage device may include, for example, HDD, block SSD, and other storage devices that use a block as a storage unit.

In step S103, the index-value pair corresponding to the index and the value in the key-value pair is written into the KV SSD. For example, for the inputted key-value pair, the index-value pair <index, value> is written into the KV SSD after the index has been added.

As described above, the KV SSD may adopt an enhanced flash translation layer (FTL) and provide a key-value write interface. Therefore, it may directly respond to the request of the application for writing the index-value pair <index, value> and write the index-value pair <index, value> into the KV SSD.

For example, when Key1-Value1 is stored, in response to the received key-value pair <Key1, Value1>, an index index1 corresponding to Key1 is generated, <Key1, index1> is stored in the block storage device, and the index-value pair <index1,Value1> is stored in the KV SSD.

Figure 4:
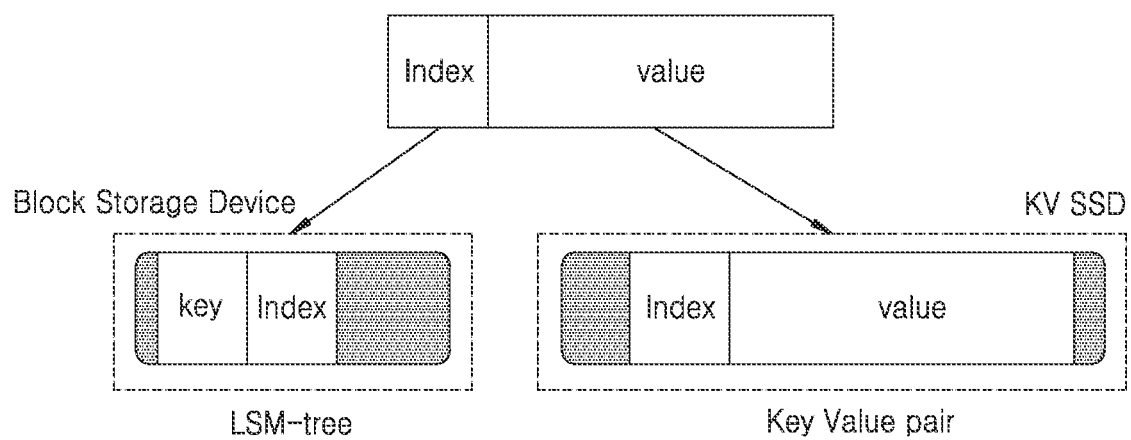
FIG. 4 is a schematic diagram showing a key value access method according to an example embodiment.

FIG. 4 is a schematic diagram showing a key-value separation access solution according to an example embodiment of the present disclosure.

Referring to FIG. 4, the key-index pair may be stored in the block storage device, and the index-value pair may be stored in the KV SSD.

According to an example embodiment, in response to receiving an instruction for reading the key, the key-index pair corresponding to the key in the block storage device is searched, and the value corresponding to the index is read from the KV SSD according to the index in the searched key-index pair. For example, when the instruction to read the key is received, the key-index pair corresponding to the key is first searched in the LSM-Tree database. When the corresponding key-index pair is found, the index-value pair corresponding to the index in the corresponding key-index pair found may be searched in the KV SSD, and when the corresponding index-value pair is queried, the value in the index-value pair queried may be read.

According to an example embodiment, a read request for key-value may be received through an application. After the read request is received, the key-index pair corresponding to the key is searched for in the block storage device. When the key-index pair corresponding to the key is found, the index-value pair in the KV SSD corresponding to the index in the key-index pair found may be requested through the application to obtain the requested key-value.

As an example, a compaction may be performed on the key-index pairs stored in the block storage device. The compaction process on the key-index pairs may be the same as the compaction process on the key-value pairs according to related art.

Since the LSM-Tree database engine targets the key-index pairs when performing the compaction, moving and copying value data between the various layers of LSM-Tree may be avoided. Since the length of the index is significantly smaller than the length of the value in general, the space amplification for data may be reduced to extend the service life of the block storage device.

As an example, the value in the key-value pair may also be updated, and updating the value in the key-value pair may include in response to receiving a new key-value pair corresponding to the key and the updated value, generating the index corresponding to the key, writing the key-index pair corresponding to the key and the index into the block storage device, and overwriting the old value corresponding to the index with the updated value in the KV SSD according to the index.

For example, after <Key1, Value1> is written, the key-index pair <Key1, index1> may be stored in the block SSD, and <index1, Value1> may be stored in the KV SSD. When the value of Key1 is updated, for example, when the value of Key1 is updated from the old value Value1 to Value2, the index index1 corresponding to <Key1, Value2> may be generated, and <Key1, index1> may be written to the block SSD. At this time, <Key1, index1> generated before the update operation and <Key1, index1> generated by the update operation may exist in different layers of LSM-Tree database (after the compaction, only the uppermost <Key1, index1> will be retained). Then <index1, Value2> will be written into KV SSD, and when <index1, Value2> is written into KV SSD, Value2 will overwrite Value1. In this case, KV SSD only stores the latest value Value2 of Key1, that is, only <index1, Value2> is stored.

According to an example embodiment, the key-index pair stored in the block storage device may further include time stamp information. Before and after updating the value in the key-value pair, the key and index stored in the block storage device may be the same, but the time stamp information may be different.

According to another example embodiment, when the value in the key-value pair is updated, it may also be considered that the index is not needed to be regenerated again, but the index corresponding to the key is searched from the block storage device according to the key, and the value corresponding to the index in the KV SSD is overwritten with the update value according to the searched index.

The numbering of the indices as described above is only for illustrative purposes and does not limit the embodiments of the present disclosure.

In addition, because the KV SSD has a feature of direct update replication, and the KV SSD transfers the garbage collection of expired value from a host to the KV SSD, the host can focus on computational work, thereby improving the overall writing performance of the system.

As described above, according to the example embodiments of the present disclosure, improved insertion and query performance of LSM-Tree may be retained by storing Key-Value separately. In addition, when the compaction is performed, only the key-index pair is copied and rewritten, which avoids the transferring and copying of value data between layers. In addition, by employing the characteristics of supporting direct overwrite without needing to care about data deletion, expired data is directly overwritten with the latest data, which significantly reduces the space amplification of LSM-Tree, while making full use of the feature of better random input and output performance, high concurrency and low system resource consumption of KV SSD to improve writing performance.

Hereinafter, a data storage control device according to an example embodiment of the present disclosure will be described with reference to FIG. 5.

Figure 5:
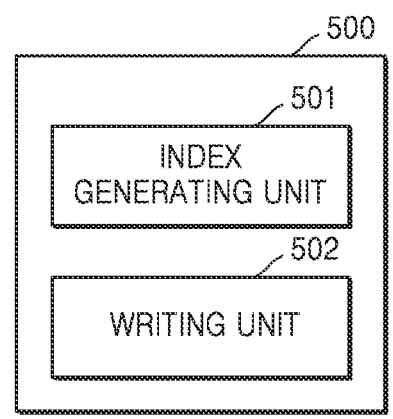
FIG. 5 is a block diagram showing a data access control device according to an example embodiment.

Referring to FIG. 5, a data access control device 500 may include an index generating unit 501 and a writing unit 502. As an example, the data access control device 500 may additionally include other components, and the components included in the data access control device 500 may also be combined.

As an example, the index generating unit 501 may include a processor configured to generate an index corresponding to a key in a key-value pair in response to the key-value pair <key, value> being received.

As an example, the writing unit 502 may include a processor configured to write a key-index pair <key, index> corresponding to the key and the index into the block storage device, where the key-index pair is stored in LSM-Tree structure in the block storage device. An index-value pair <index, Value> corresponding to the index and the value in the key-value pair is written into the KV SSD.

According to an example embodiment, an electronic device may be installed with a block storage device and a KV SSD, and the electronic device or a processor of the electronic device may be used as the data access control device.

According to an example embodiment, the data access control device 500 may further include a searching unit. The searching unit may include a processor configured to in response to an instruction for reading the key, search a key-index pair corresponding to the key in the block storage device, and according to the index in the searched key-index pair, read an index-value pair corresponding to the index from the KV SSD.

According to an example embodiment, the data access control device 500 may further include a compaction unit, and the compaction unit may include a processor configured to compact the key-index pairs stored in the block storage device.

According to an example embodiment, when the value in the key-value pair is updated, the index generating unit is further configured to generate an index corresponding to the key in response to receiving a new key-value pair corresponding to the key and a update value.

According to an example embodiment, when the value in the key-value pair is updated, the writing unit is also configured to write the key-index pair corresponding to the key and the index into the block storage device, and according to the index, overwrite the old value corresponding to the index with the updated value in the KV SSD.

Figure 6:
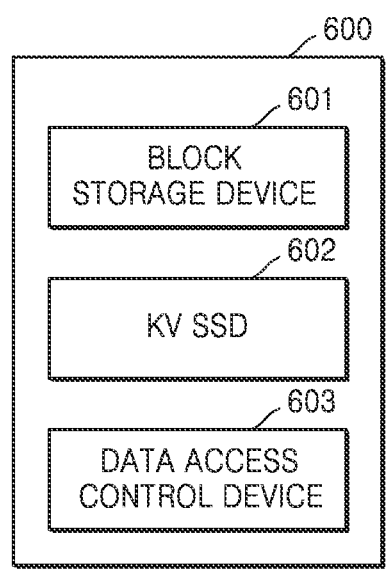
FIG. 6 is a block diagram illustrating a data access system according to an example embodiment.

FIG. 6 is a block diagram showing a data access system according to an example embodiment of the present disclosure.

Referring to FIG. 6, the data access system 600 includes a block storage device 601, a KV SSD 602, and a data access control device 603.

The data access control device in FIG. 6 may be the same as the data access control device 500 in FIG. 5, and descriptions will not be repeated here.

According to an example embodiment of the present disclosure, a computer-readable storage medium storing a computer program, when executed by a processor, may cause the processor to implement the data access method as described above.

According to an exemplary embodiment of the present disclosure, a data storage device may include a processor, a memory storing a computer program, when executed by the processor, causing the processor to implement the data access method as described above.

While example embodiments have been described, various changes in form and details can be made without departing from the spirit and scope of the claims and their equivalents. The examples disclosed herein are to be considered in a descriptive sense and not for the purpose of limitation. Descriptions of features or aspects in each example embodiment will be considered applicable to similar features or aspects in other embodiments. If the described techniques are performed in a different order, and/or if the described systems, structures, devices or circuits are combined in different ways and/or replaced or supplemented by other components or their equivalents, suitable results may be obtained. Therefore, the scope of disclosure is not defined by the detailed description, but by the claims and their equivalents. All changes within the scope of the claims and their equivalents will be deemed to be included in the present disclosure.

What is claimed:

1. A data access method comprising:
generating an index corresponding to a key in a first key-value pair in response to receiving the first key-value pair;
writing a key-index pair corresponding to the key and the index into a block storage device, the key-index pair being stored in the block storage device in a log-structured merge-tree (LSM-Tree) structure;
writing an index-value pair corresponding to the index and a value in the first key-value pair into a key-value solid state drive (KV SSD);
searching the key-index pair corresponding to the key in the block storage device in response to receiving an instruction for reading the key; and
reading the value corresponding to the index from the KV SSD based on the searched index in the key-index pair.

2. The method of claim 1, further comprising:
performing a compaction on the key-index pair stored in the block storage device.

3. The method of claim 2, further comprising:
generating the index corresponding to the key in response to receiving a second key-value pair corresponding to the key and a updated value;
writing the key-index pair corresponding to the key and the index into the block storage device;
overwriting the value corresponding to the index in the KV SSD with the updated value based on the index.

4. A data access control device comprising at least one processor configured to implement:
an index generating unit configured to generate an index corresponding to a key in a first key-value pair in response to receiving the first key-value pair; and
a writing unit configured to:
write a key-index pair corresponding to the key and the index into a block storage device, the key-index pair being stored in the block storage device in a log-structured merge-tree (LSM-Tree) structure; and
write an index-value pair corresponding to the index and a value in the first key-value pair into a key-value solid state drive (KV SSD); and
a searching unit configured to:
search the key-index pair corresponding to the key in the block storage device in response to receiving an instruction for reading the key; and
read the value corresponding to the index from the KV SSD based on the searched index in the key-index pair.

5. The data access control device according to claim 4, wherein the at least one processor is further configured to implement a compaction unit configured to:
perform a compaction on the key-index pair stored in the block storage device.

6. The data access control device of claim 5, wherein when updating the value in the first key-value pair, the index generating unit is further configured to:
generate the index corresponding to the key in response to receiving a second key-value pair corresponding to the key and a updated value;
write the key-index pair corresponding to the key and the index into the block storage device; and
overwrite the value corresponding to the index in the KV SSD with the updated value based on the index.

7. A data access system comprising:
a block storage device;
a key-value solid state drive (KV SSD); and
a data access control device comprising at least one processor configured to implement:
an index generating unit configured to generate an index corresponding to a key in a first key-value pair in response to receiving the first key-value pair; and
a writing unit configured to:
write a key-index pair corresponding to the key and the index into the block storage device, the key-index pair being stored in the block storage device in a log-structured merge-tree (LSM-Tree) structure; and
write an index-value pair corresponding to the index and a value in the first key-value pair into the KV SSD; and
a searching unit configured to:
search the key-index pair corresponding to the key in the block storage device in response to receiving an instruction for reading the key; and
read the value corresponding to the index from the KV SSD based on the searched index in the key-index pair.

8. The data access control device according to claim 7, wherein the at least one processor is further configured to implement a compaction unit configured to
perform a compaction on the key-index pair stored in the block storage device.

9. The data access control device of claim 8, wherein when updating the value in the first key-value pair, the index generating unit is further configured to:
generate the index corresponding to the key in response to receiving a second key-value pair corresponding to the key and a updated value;
write the key-index pair corresponding to the key and the index into the block storage device; and
overwrite the value corresponding to the index in the KV SSD with the updated value based on the index.

10. A computer-readable storage medium storing a computer program, when executed by a processor, the computer program being configured to cause the processor to implement the method of claim 1.

11. A computer-readable storage medium storing a computer program, when executed by a processor, the computer program being configured to cause the processor to implement the method of claim 2.

12. A computer-readable storage medium storing a computer program, when executed by a processor, the computer program being configured to cause the processor to implement the method of claim 3.

13. A data storage device comprising:
a processor;
a memory configured to store a computer program, when executed by the processor, the computer program being configured to cause the processor to implement the method of claim 1.

14. A data storage device comprising:
a processor;
a memory configured to store a computer program, when executed by the processor, the computer program being configured to cause the processor to implement the method of claim 2.

15. A data storage device comprising:
a processor;
a memory configured to store a computer program, when executed by the processor, the computer program being configured to cause the processor to implement the method of claim 3.

* * * * *